May 3, 1927.

M. H. STARR 1,627,124

WEIGHING MACHINE

Filed Dec. 29, 1924

INVENTOR
Morton H. Starr,
BY
M. F. Gannett
ATTORNEY

May 3, 1927.

M. H. STARR 1,627,124

WEIGHING MACHINE

Filed Dec. 29, 1924　　9 Sheets-Sheet 3

INVENTOR
Morton H. Starr,
BY
ATTORNEY

May 3, 1927.

M. H. STARR 1,627,124

WEIGHING MACHINE

Filed Dec. 29, 1924    9 Sheets-Sheet 6

INVENTOR
*Morton H. Starr,*
BY
ATTORNEY

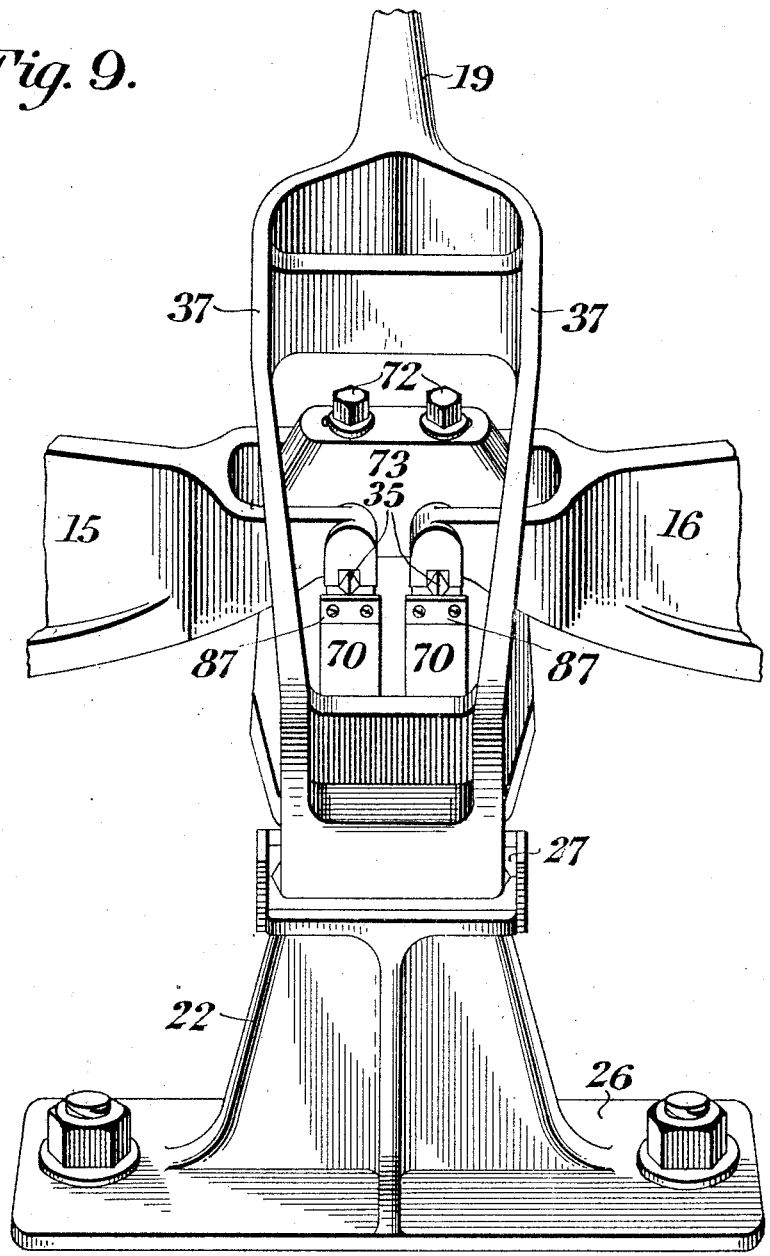

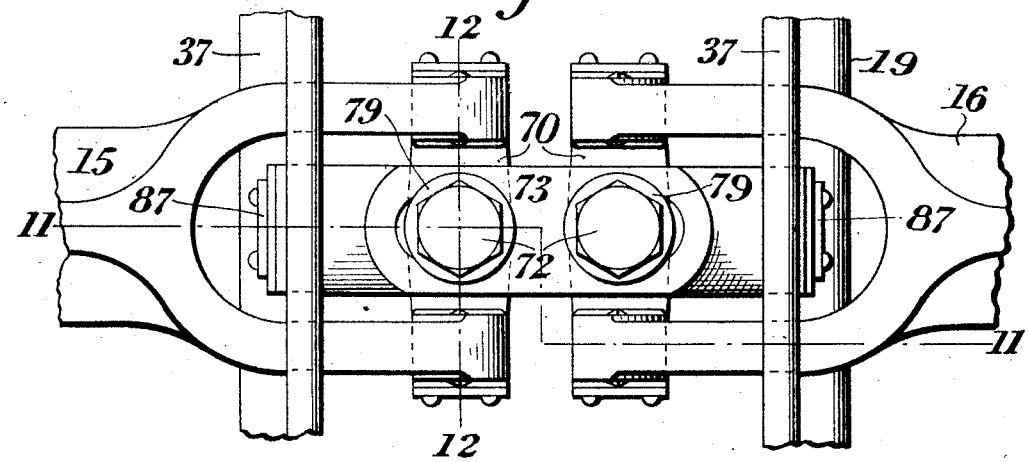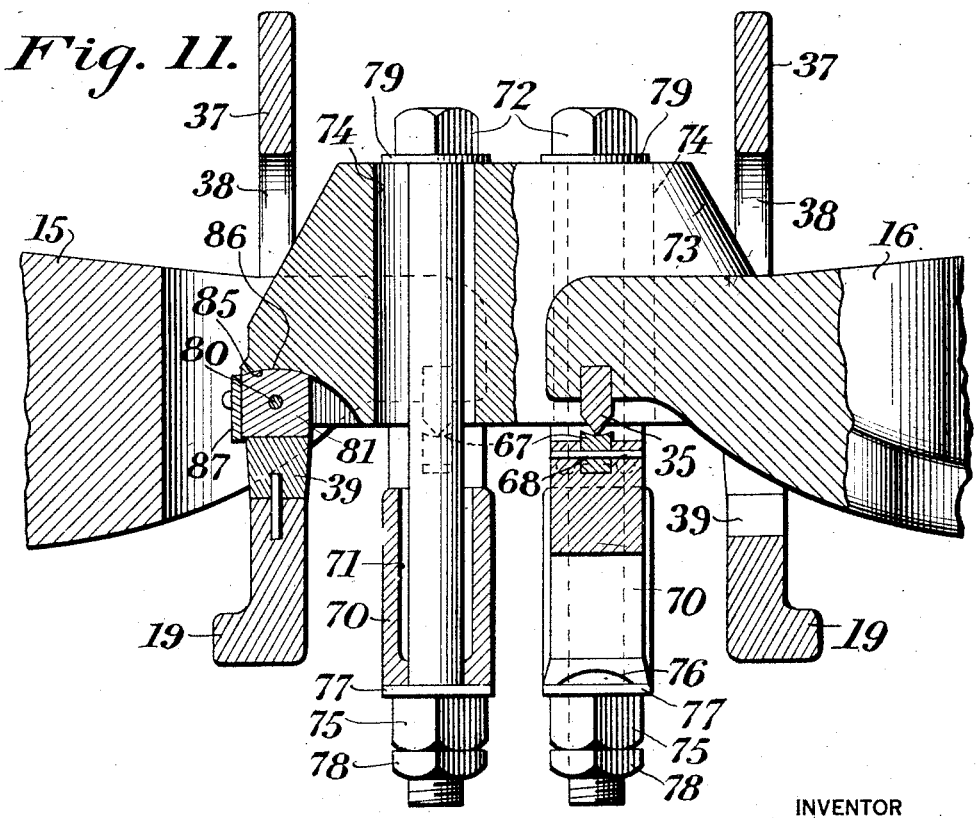

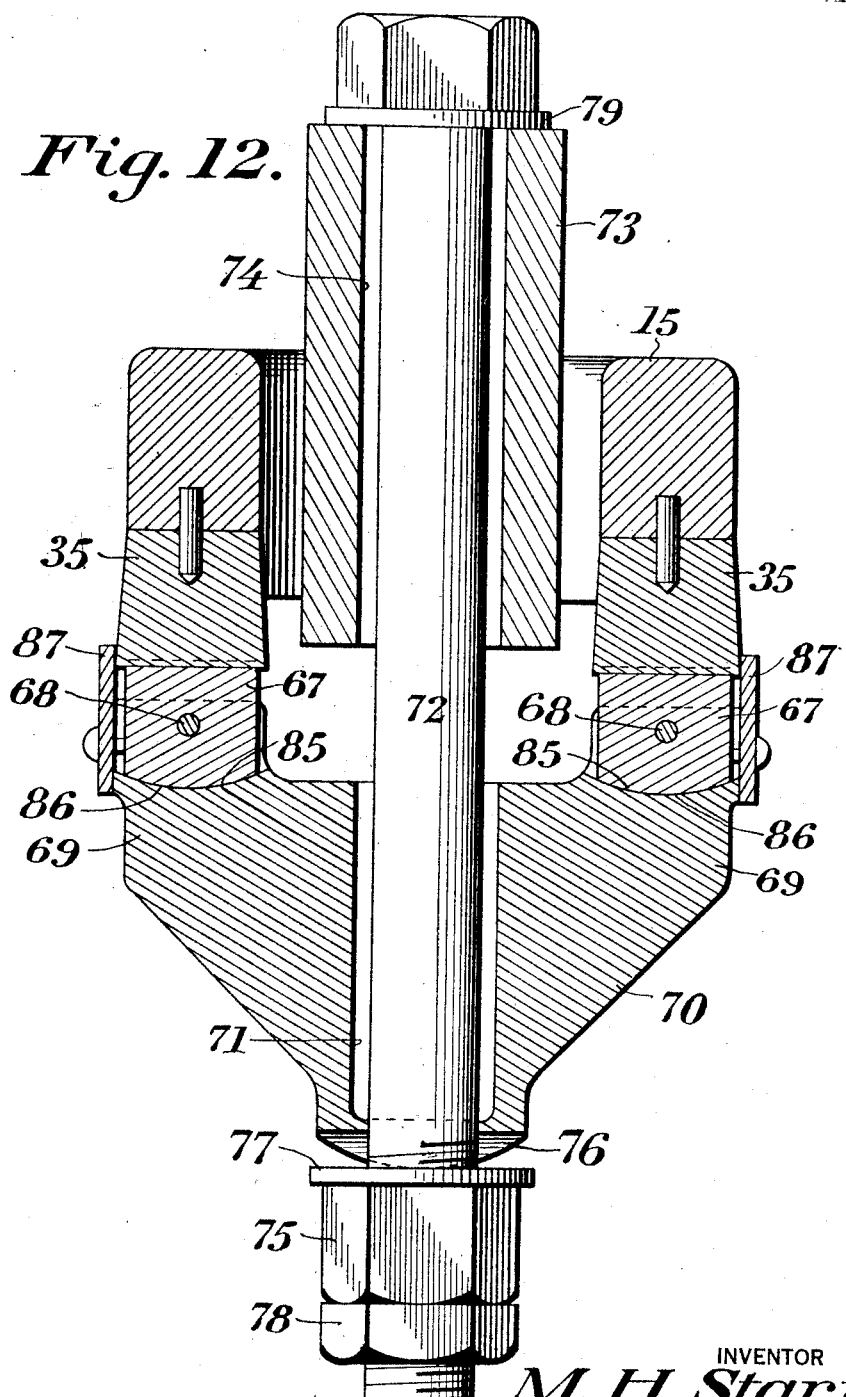

Patented May 3, 1927.

1,627,124

UNITED STATES PATENT OFFICE.

MORTON H. STARR, OF ST. JOHNSBURY, VERMONT, ASSIGNOR TO E. AND T. FAIRBANKS AND COMPANY, OF ST. JOHNSBURY, VERMONT, A CORPORATION OF VERMONT.

WEIGHING MACHINE.

Application filed December 29, 1924. Serial No. 758,521.

This invention relates to scales, and more particularly to platform scales suitable for use in weighing motor trucks, and other vehicles which carry the greatest amount of load on their rear wheels.

It is an object of this invention to provide an improved weighing machine of the character mentioned which is relatively simple in construction, and reliable and exact in function under all conditions of service.

Another object is to provide an improved scale in which all knife-edges in the lever system are at the same level.

A still further object of the invention is to provide a lever system characterized by having adjustably mounted universal compensating connections between all of the levers.

Another object is to provide a scale having main levers arranged in pairs, the ends of such levers projecting into an opening formed in an extension lever and being connected to the extension lever by means which permit the placing of the pivots in the main levers and the extension lever at the same level.

It is also an object to provide an improved scale employing pairs of main levers connected to a pair of end extension levers, the latter levers being in turn connected to a transverse extension lever, wherein similarly constructed means are used for connecting the entire lever system.

The invention also comprises certain new and useful improvements in the construction, arrangement and combination of the several parts of which it is composed, as will be hereinafter more fully described and claimed.

Referring to the accompanying drawings, wherein I have shown the preferred embodiment of my invention:—

Fig. 9, is a detail perspective view of the butt end of one of the end extension levers, showing a portion of the ends of two of the main levers, and the means for connecting the main levers and for also transmitting the load stresses to the extension lever;

Fig. 10, is an enlarged plan of the parts shown in Fig. 9;

Fig. 11, is a vertical section taken on the line 11—11 of Fig. 10; and

Fig. 12, is a similar view taken on the line 12—12 of Fig. 10.

Figure 1:
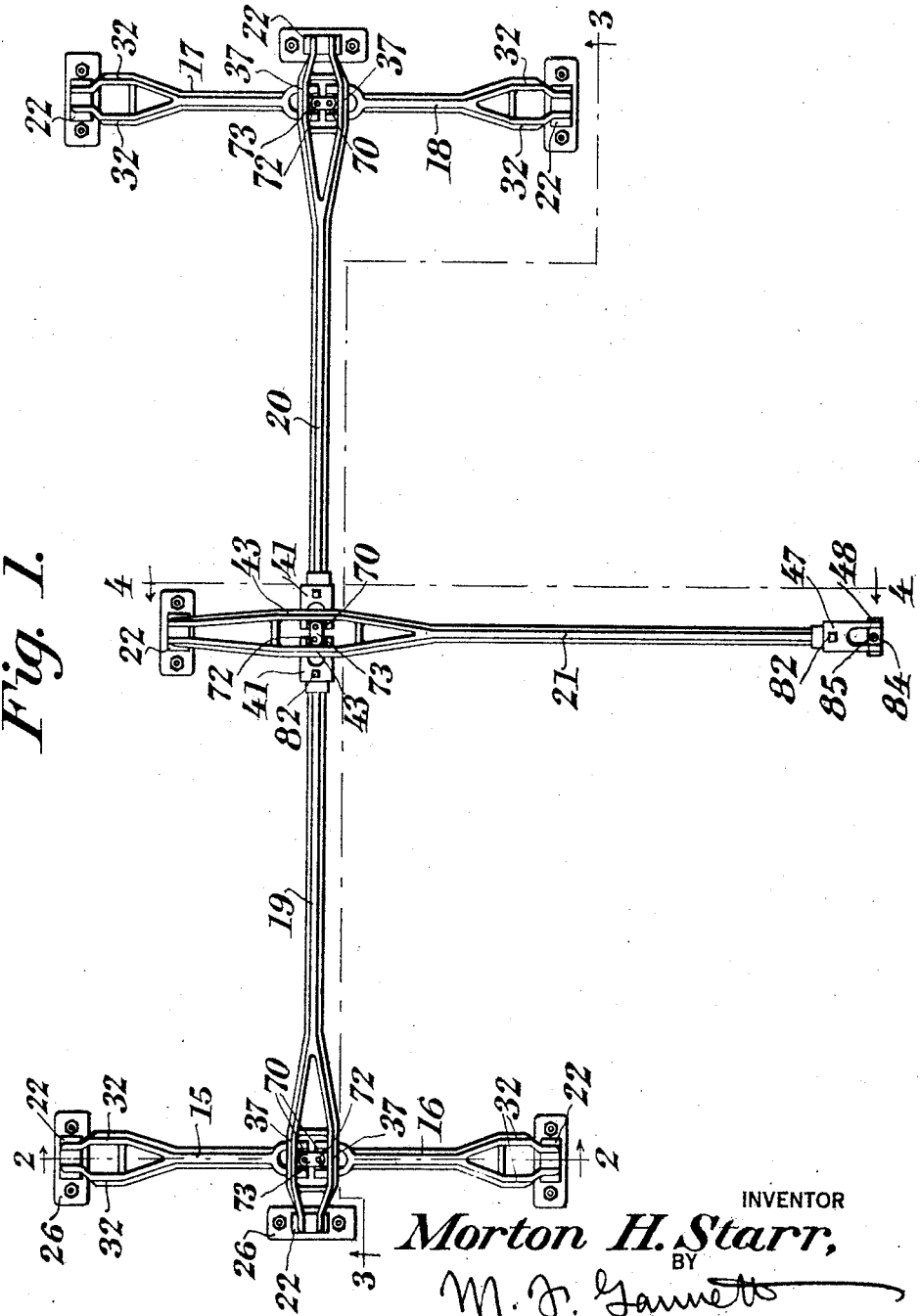
Figure 1, is a plan of the system of levers employed.

Referring more particularly to the illustrated embodiment of the invention and the general layout of Fig. 1, two spaced pairs of main levers 15, 16 and 17, 18 are employed to receive the superposed load and transmit the same to end extension levers 19, 20 which in turn transmit a predetermined reduction of the load to a transverse extension lever 21, adapted for connection with a scale beam.

The main levers, which are fulcrumed at their outer or butt ends on supports 22, are connected to the end extension levers by improved means that enable the pivots of the main levers to be placed at the same level with the pivots in the end extension levers.

The end extension levers, which receive the load from the main levers reduced by their multiplication, are fulcrumed on supports similar to those used for the main levers. Each of the end extension levers is arranged with as high a multiplication as is consistent with good design, and their adjoining ends are connected to the transverse extension lever 21 by connecting means of a similar nature to that used between the main levers and the end extension levers, as will be hereinafter more fully described.

The transverse extension lever 21 has its rear or butt end fulcrumed on a support similar to that used for the main and end extension levers. Thus, in the present instance all of the levers are fulcrumed on similar supports 22, the detail construction of which will be presently described.

In the present design the levers are all of the second order, and all of the pivots are placed on the same level. All of the levers move downwardly under the influence of the load and the levers receiving the load directly from the platform and the two end extension levers which transmit the load to the transverse extension lever, all transmit their power by a downward push, instead of a downward pull. Therefore, the use of an even lever of the first order connected to a pull-up extension lever of the first order is not necessary, and hence the bottom of the scale pit can be made flat without any depressions. Such pit will also be comparatively shallow.

In the present instance, I have shown the foundation for the scale consisting of unitary concrete structure having a bottom 23 and side walls 24. Arising from the bottom and formed integral therewith are piers 25 upon which rest the lever supports 22.

The supports 22 are in the nature of stands which include a base 26 suitably bolted to the piers 25. Mounted in the top of each stand is a hardened steel bearing seat 27 adapted to receive the fulcrum pivots of the levers. In the design of scale herein disclosed, seven lever stands are employed, and in the construction of the foundation the upper surfaces of the piers are made the same elevation so as to bring the seats 27 as near as possible in the same horizontal plane.

Figure 2:
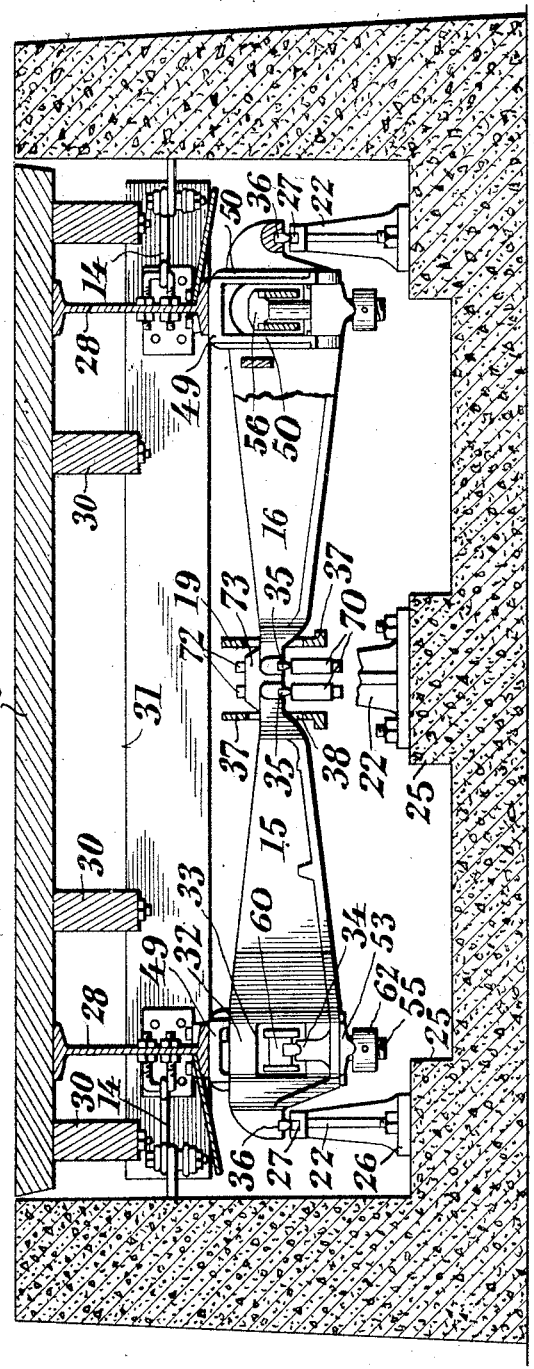
Fig. 2, is a vertical transverse section, taken approximately on the line 2—2 of Fig. 1, illustrating one pair of main levers and the mode of supporting the platform therefrom, parts being broken away to more clearly show the underlying structure.
Figure 3:
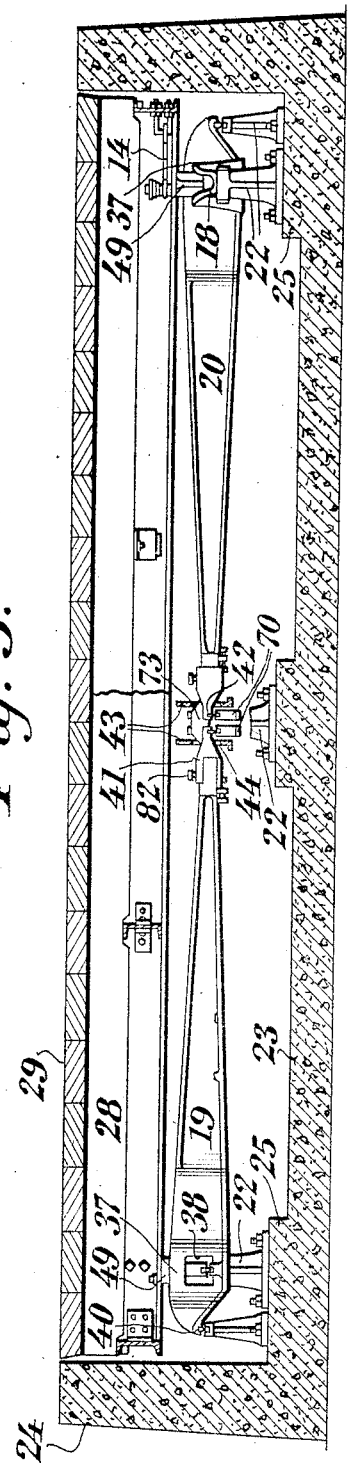
Fig. 3, is a vertical longitudinal section, taken approximately on the line 3—3 of Fig. 1, parts being omitted for sake of clearness.
Figure 4:
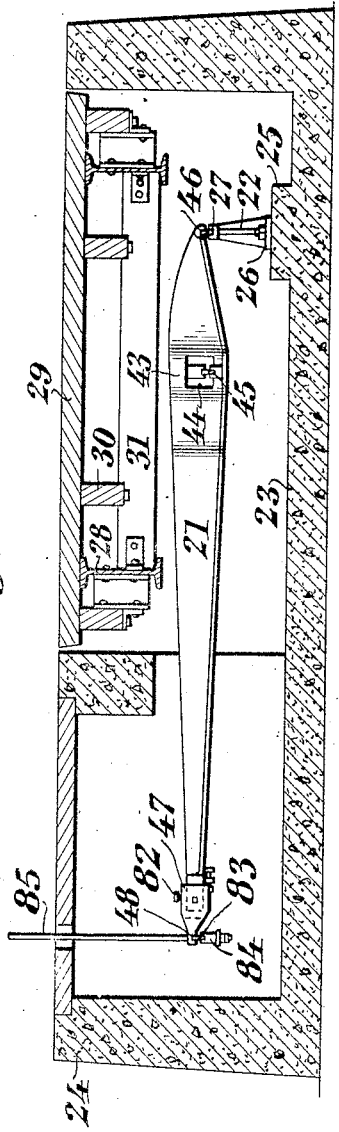
Fig. 4, is a vertical transverse section, taken approximately on the line 4—4 of Fig. 1, illustrating the transverse extension lever, parts being omitted for sake of clearness.
Figure 5:
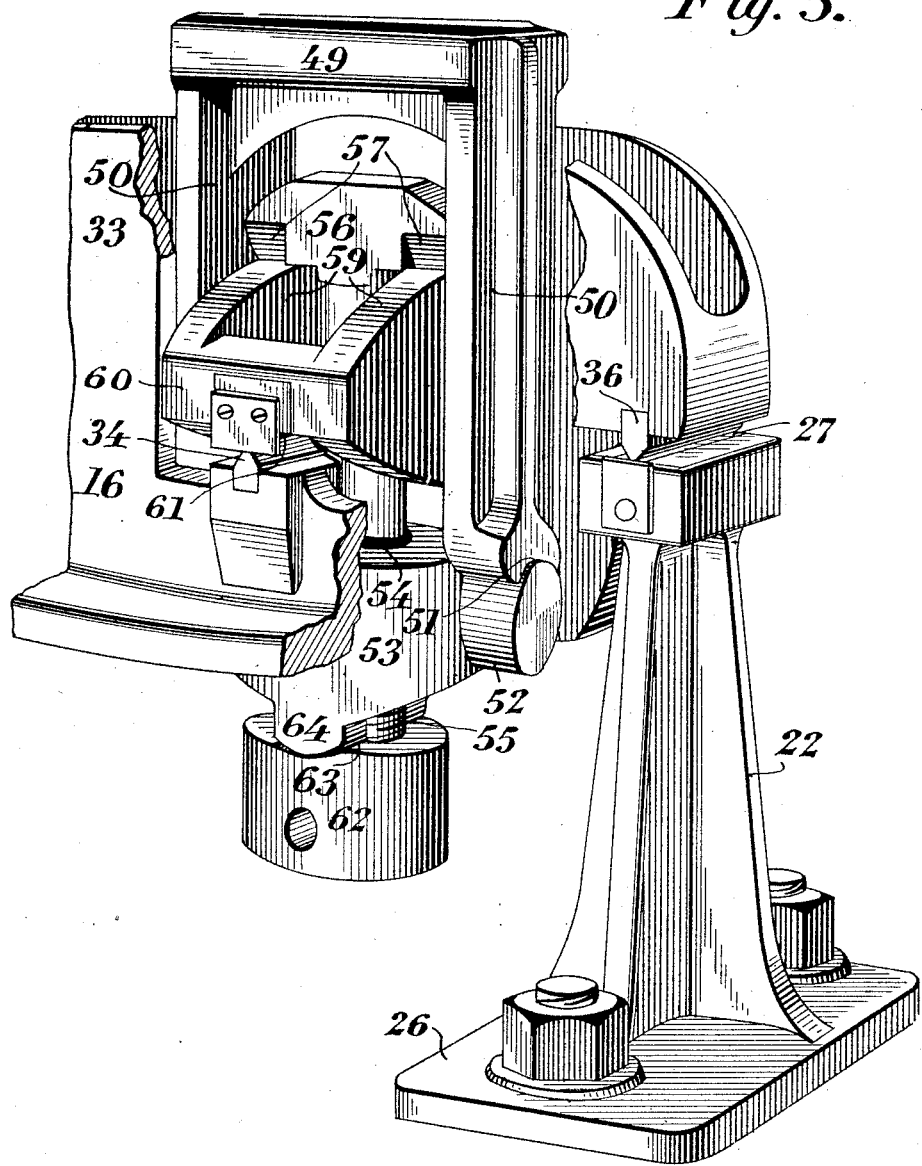
Fig. 5, is a detail perspective view of the butt end of one of the main levers, showing the lever mounted on its stand, and also illustrating the platform girder supporting and load transmitting means, a portion of the lever being broken away to show the underlying structure.
Figure 6:
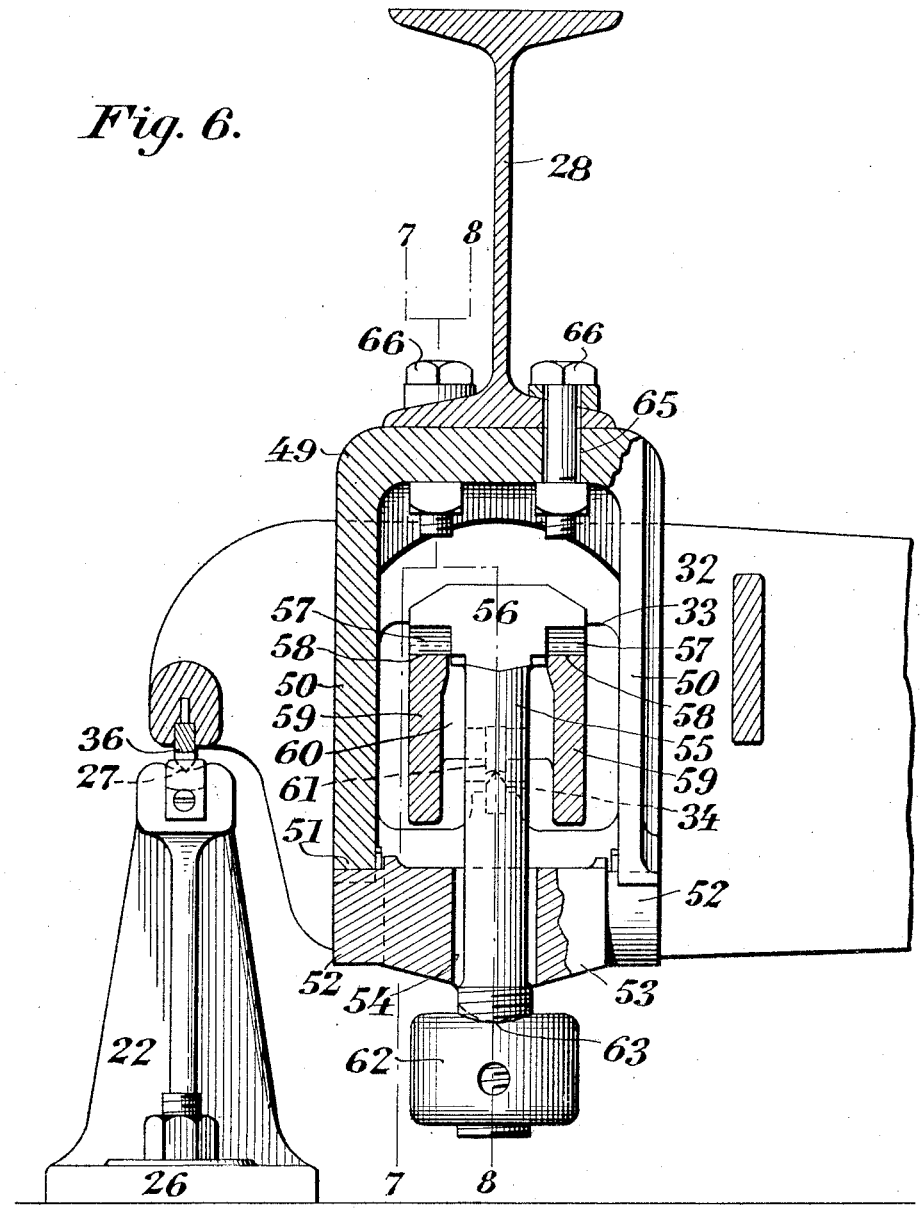
Fig. 6, is a vertical longitudinal section through the parts shown in Fig. 5, the girder being shown on its support.
Figure 7:
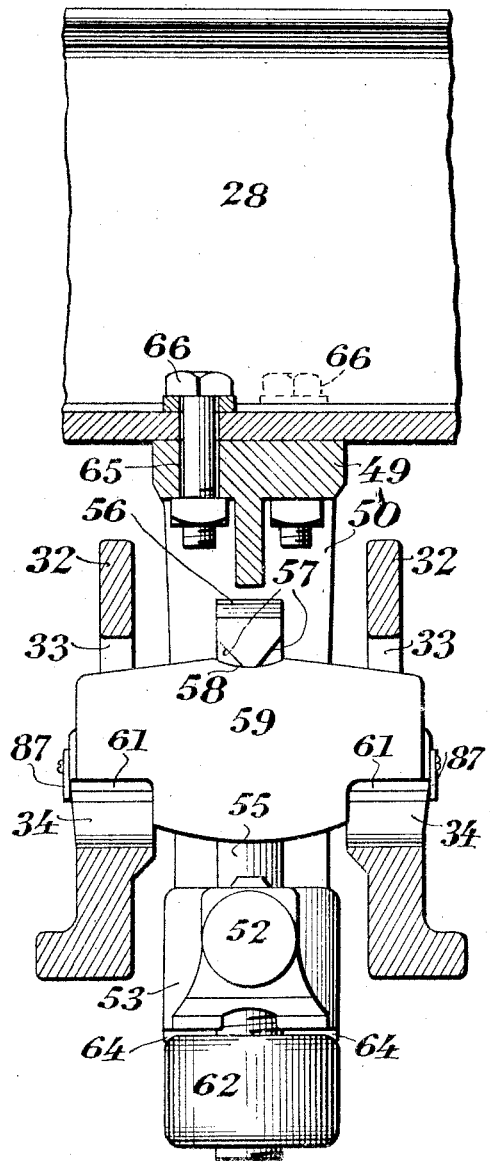
Fig. 7, is a vertical transverse section taken on the line 7—7 of Fig. 6.
Figure 8:
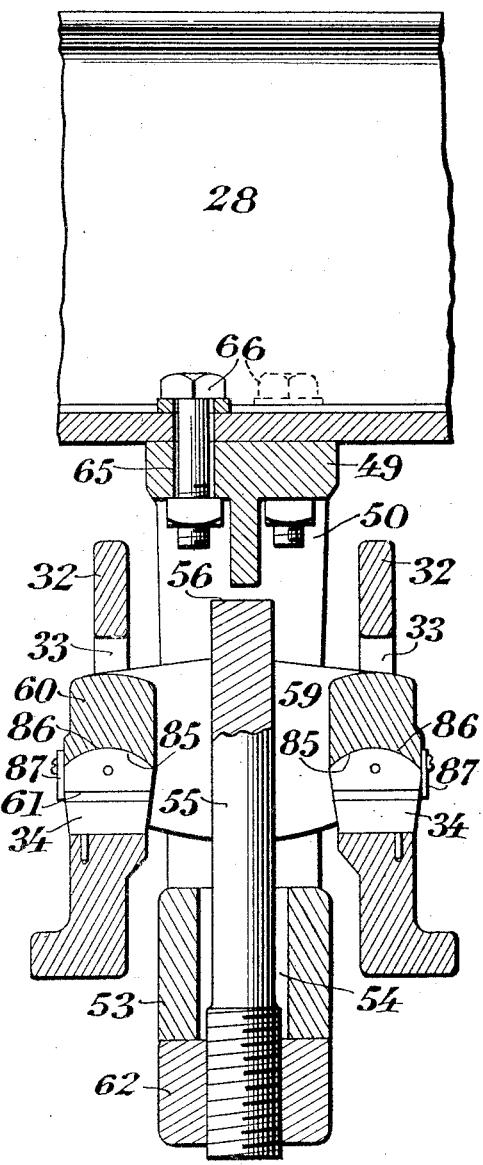
Fig. 8, is a similar view taken on the line 8—8 of Fig. 6.

Positioned above the levers are longitudinal girders 28 which are arranged to carry a platform 29. As shown, the platform lies flush with the top of the side walls 24. If so desired the platform can be composed of planks laid transversely the girders 28, such planks being tied together by means of stringers 30, which in turn can be reinforced by means of spaced channels 31 bracketed to the girders 28, as shown in Figs. 2, 3, and 4. The load stresses from the platform are transmitted through the girders to the main levers by means of connections shown in Figs. 2, 5, 6, 7 and 8 and to be described. As is customary with devices of this character, the platform is provided with suitable check rods 14 which are anchored in the side walls 24.

Each main lever casting is in the nature of a single web that is formed near the butt end with a double web section to provide a pair of spaced side walls 32. Aligned openings 33 are formed in these side walls, and the lower portion of each side wall adjacent to the bottom of the openings is thickened so as to provide a boss in which a hardened steel knife-edge pivot bearing 34 may be securely fitted. The load transmitting means are adapted to be inserted in the space provided by the double web portion of the lever. As shown, the free ends of the main levers are bifurcated to provide for a pair of spaced knife-edge bearings 35 that are securely fitted therein, while the opposite or butt end of the lever is fitted with a knife-edge pivot 36 which is adapted to engage the seat 27 in the top of the stand 22.

Each end extension lever casting, like the main lever casting, is in the nature of a single web that is formed near the butt end with a double web section to provide a pair of spaced side walls 37. Through openings 38 formed in the side walls, are adapted to project the free ends of the corresponding pair of main levers, while adapted to be inserted in the space between such side walls and arranged between the ends of the main levers, are the means for transmitting load stresses from the main levers to the end extension levers.

For the purpose of supporting the load transmitting means, the lower edge of each of the side walls 37 is thickened so as to provide bosses in which hardened steel knife-edge pivot bearings 39 may be securely fitted (see Fig. 11). The butt end of each end extension lever is fitted with a knife-edge pivot 40 which is adapted to engage the seat 27 in the top of the stand 22 for such extension levers, while the opposite or free end of the lever is provided with an adjustably mounted nose iron 41 that has its outer end bifurcated to provide for a pair of spaced knife-edge bearings 42 that are securely fitted therein, (see Figs. 1 and 3).

The transverse extension lever casting comprises a single web section that is formed near its butt end with a double web section to provide a pair of spaced side walls 43. Through openings 44 formed in the side walls are adapted to project the free ends of the end extension levers 19, 20, while inserted in the space between such side walls and arranged between the ends of the levers, are the means for transmitting load stresses from the end extension levers to the transverse extension lever.

For the purpose of supporting the load transmitting means the lower edge of each of the side walls 43 is thickened so as to provide bosses in which hardened steel knife-edge pivot bearings 45 may be securely fitted, (see Fig. 4). The butt end of the transverse extension lever 21 is fitted with a knife-edge pivot 46 that is adapted to engage the seat 27 of the stand 22 for such lever, while the opposite or free end of the lever is provided with an adjustably mounted nose-iron 47, that has its outer end bifurcated to provide for a pair of spaced knife-edge bearings 48 securely fitted therein.

Load stresses are transmitted from the scale platform to the respective main levers through main girder chairs 49, each of the latter being composed of a casting having spaced depending legs 50 which have concave recesses 51 on the lower ends arranged to contact with trunnions 52 on an adjustable trunnion block 53. There is thus formed a pivotal support between the girder chair and the main lever wherein the pivotal axis extends longitudinally and centrally of the main lever between the side walls 32, and whereby slight movement of the girder chair transversely of the lever is permitted.

The trunnion block 53 has a central vertical opening 54 through which extends a suspension bolt 55. The bolt has an elongated head 56 so formed as to provide a pair of oppositely projecting lugs. The lower portion of these lugs is bevelled to form V-shaped bearings 57 that are adapted to be mounted on concaved seats 58 formed in the upper faces of spaced side walls 59 of a saddle member 60. In this manner the bolt will be pivotally suspended from such saddle member, the shank of the bolt extending therethrough.

The saddle member in turn has its ends fitted with concaved bearing seats 61, which are adapted to rest on the knife-edge pivots 34 of the main levers. It will be noted that these bearings are of substantial length whereby the maximum amount of the load weighed, which is transmitted to the main lever, is adequately provided for. The bearings are also separated so that there is ample clearance therebetween for the centrally disposed suspension bolt 55 which is thus boxed in the registering openings between the double web of the main lever and the saddle and centrally of the bearing seats thereof.

The bolt 55 is threaded on its lower end and a nut 62 is screwed thereon for the purpose of adjustably positioning the trunnion block 53 to govern the relative vertical disposition of the main girder chair with respect to the corresponding main lever. This adjusting nut may also be provided on its upper surface with radial recesses 63, and the trunnion block may have a pair of complementary projections 64 adapted to engage in said depressions to lock the members against relative rotation.

The construction described provides in effect an universal joint between the girder chair and the main lever. At the same time the disposition of the pivotal bearing points is such that the load is transmitted substantially linearly at the intersection of the center planes of the girder and the main lever. Furthermore, the construction described is of especial advantage in that the castings and parts are capable of ready manufacture and expeditious assembly; that is to say, the saddle member 60 may be readily placed on the pivots 34 of the main lever by inserting such saddle longitudinally down through the opening which the spaced side walls 32 provide and then turning the saddle transversely so that the seats 61 rest on the pivots 34. The suspension bolt 55 is next installed from above with the head thereof disposed transversely the saddle so that the bearings 57 thereof will engage the seats 61 of the saddle. The trunnion block 53 and nut 62 are then positioned upon the depending end of the suspension bolt from below. The girder chair 49 straddles the saddle 60 and the suspension bolt, and may be thus readily positioned. The girder chair can be provided with staggered openings 65 to receive bolts 66 projecting downwardly through the bottom flange of the girder, and in this manner the latter can be securely fastened in place above the levers.

The connections for transmitting the load stresses from the pairs of main levers to the end extension levers, and from the end extension levers to the transverse extension lever are similar in each instance, and Figs. 9 to 12 inclusive show details of the typical connection between one pair of main levers and one of the end extension levers.

As shown, the free bifurcated ends of the main levers 15, 16 project into the opening between the double web of the end extension lever with the knife-edge pivots 35 of the main levers lying in the same horizontal plane as the knife-edge pivot bearings 39 of the end extension lever.

The pivot bearings 35 are each seated on concaved bearings 67 secured in position by dowel-pins 68 in spaced arms 69 of a block 70. In the present instance, one block is positioned transversely to the end of each main lever, and is particularly shown by Fig. 11, the pair of blocks used for supporting the ends of the levers 15, 16 are disposed between the side walls 37 of the extension lever 19 on each side of the longitudinal axis of such lever. By referring to Fig. 12, it will be noticed that the block 70 is V-shaped in form, with the bearings 67 mounted in its extreme ends.

Each block 70 has a central vertical opening 71 through which is passed a suspension bolt 72. The bolt for each block is supported from a saddle member 73 which is positioned between the bifurcated ends of the corresponding main levers, and extending into the side openings of the end extension lever. The saddle is provided with a pair of spaced openings 74 through which the pair of bolts 72 used for connecting the parts extend. By preference, the openings 74 are in the nature of vertical slots whose width is slightly greater than the diameter of the bolts, and whose length is sufficient to enable the shifting or other movement of the parts longitudinally of the saddle without friction or other interference.

All of the bolts 72 are threaded on their lower ends, and a nut 75 is screwed thereon for the purpose of adjustably positioning the block 70 to govern the relative vertical disposition of the ends of the main levers with respect to the extension lever.

For the purpose of reducing the friction between the parts, the bottom of the block may be formed with an arcuate extension 76 adapted to engage a washer 77 carried by the bolt 72 above the nut 75. If so desired, a lock nut 78 may be used to retain the nut 75 in its adjusted position. Likewise, a washer 79 may be inserted beneath the head of the bolt so as to provide a bearing surface between the head of the bolt and the top of the saddle.

Loosely mounted in each end of the saddle 73 and retained in position by means of a dowel-pin 80 is a steel bearing 81 having a concaved surface that rests upon the knife-edge pivots 39 of the end extension lever. In this manner the saddle is pivotally supported by the extension lever. The openings 71 and 74 are made larger than the diameter of the bolt 72 so that the two blocks 70 and the saddle 73 may rock on their respective pivots without interference, as will be readily understood.

The connection described provides in effect an universal joint between the levers, such connection permitting ready adjustment of the parts, and easy replacement when desired. As the free ends of the main levers extend between the supports provided by the pivots 39 in the end extension levers, load stresses will be transmitted from such levers through the knife-edge pivotal bearings 35 to the respective bearing blocks 70, and thence through the bolts 72 and saddle 73 to the knife-edge bearings of the extension levers.

From each of the end extension levers 19, 20 load stresses are transmitted to the transverse extension lever 21 by connections duplicating the parts just described, and, therefore, in Figs. 1 to 4 inclusive, I have applied similar reference numbers to designate corresponding parts of such connections. It is therefore believed a further description and explanation of the center connection of the levers is not necessary.

As the nose irons 41 and 47 in the ends of the levers 19, 20 and 21 are adapted for relative longitudinal adjustment, such nose irons can be slidably mounted on the ends of the levers in any desirable manner, and they can be retained in adjusted position by means of bolts 82.

Suitable connecting means between the outer free end of the transverse lever 21 with the steelyard and beam are provided. As shown by Figs. 1 and 4, this connection includes the nose iron 47 carrying the pair of transversely mounted pivots 48 which are supported on concaved bearing seats 83 carried by a block 84 which is similar in form to the block 70 previously described. Passing through the block 84 and retained therein in a manner similar to that used for mounting the bolts 72, is a vertically disposed load transmitting rod 85, the upper end of which is adapted to be connected to a weigh-beam, or other weight indicating mechanism.

The bearings 61, 67 and 81 are each provided with curved backs 85 which are fitted in arcuately formed recesses 86 of similar curvature. As these bearings are pivotally mounted by means of dowel-pin connections previously described, it will be apparent that the construction provides ready adjustment of the bearings, and assures a full line contact with the respective knife-edge pivots. This reduces the amount of wear considerably. Plates 87 can be attached to the blocks for the purpose of limiting the angular movement of the bearings which are pivotally mounted in position.

It will be understood that the various knife-edge pivots and the concaved bearing seats therefor as employed through the lever system are of hardened steel or other suitable wear-resistant material. It will be observed further that the knife-edge bearings described are of graduated dimension, decreasing in length as the quantitative load force transmitted thereto decreases, but that in each instance the connection between the levers is such as to provide adequate dimension of the pivotal bearing parts. The adjusting of the scale, as a whole, can be expeditiously effected by reason of the various adjustable connections whereby the respective lengths of the connecting lever arms are variable.

The functional and structural objects above stated are thus seen to be obtained in the construction described. It is to be understood that certain features of the invention are capable of modification and combination in scales of other types without sacrifice of the attendant advantages.

Having thus described my invention, what I claim is:—

1. In a scale, the combination with a lever having an opening formed therein, of two levers arranged transversely thereto and having their ends projecting into the said opening, and adjustably mounted universal connections between the said levers, 2. In a scale, the combination with a lever having an opening formed therein, of two levers arranged transversely thereto and having their ends projecting into said opening, and flexible aligning connections between the said levers.

3. In a scale, the combination with a lever having an opening formed therein, of two levers arranged transversely thereto and having their ends projecting into the said opening, and adjustably mounted universal compensating connections between the said levers.

4. In a scale, the combination with a lever having an opening formed therein, of two levers arranged transversely thereto and having their ends projecting into the said opening.

5. In a scale, the combination with a lever having an opening formed therein, and pivot bearings arranged on the opposite sides of said opening, of a pair of levers arranged transversely to said first-named lever and having their ends projecting into said opening, the ends of said transverse levers being supported from the said spaced apart bearings.

6. In a scale, the combination with a lever having an opening formed therein, and pivot bearings arranged on the opposite sides of said opening, of a pair of levers arranged transversely to said first named lever and having their ends projecting into said opening, and means carried by the first-named lever for supporting the ends of the other levers.

7. A lever system for weighing scales characterized by having all of the levers of the same general configuration, each of said levers having an opening formed therein, and spaced alined knife-edge pivots disposed on each side of said opening.

8. A lever system for weighing scales characterized by having all of the levers of the same general configuration, each of said levers having an opening formed therein, and load transmitting means mounted in the said openings.

9. A lever for weighing scales comprising a single web casting having a double web section formed in a portion of its length so as to provide an opening that is centrally disposed on the longitudinal axis of the lever, and pivot bearings mounted in the said section on each side of the said lever axis.

10. A lever for weighing scales comprising a single web casting having a double web section formed in a portion of its length and one of its ends bifurcated, and a pair of aligned bearings mounted in both the double web and the bifurcated end of the lever, such bearings being disposed to each side of the longitudinal axis of the lever.

11. A platform scale including a platform, and a lever system for transmitting load stresses from the platform, said system including levers having vertical openings formed therein, and connections between the levers, said connections being mounted in the said openings centrally of the axes of the levers.

12. A platform scale including a platform, and a lever system for transmitting load stresses from the platform, said system including levers having vertical openings formed therein, and connections between the levers, and also between the levers and platform, said connections being mounted in the said openings centrally of the axes of the levers.

13. A platform scale including a platform and a lever system supporting said platform, all of said levers comprising a single web having a double web section formed in a portion of its length so as to provide an opening along the longitudinal axis of each lever, and connections between said levers, said connections being installed within the said lever openings.

14. A platform scale having a lever system in which all of the levers are of the second order, including, a platform, a pair of main levers under each end of the platform, a transverse extension lever for actuating a weight indicating mechanism, levers for transmitting the effect of the load from the main levers to the transverse lever, all of said levers comprising a single web having a double web section formed in a portion of its length so as to provide an opening along the longitudinal axis of each lever, and connections between said levers, said connections being installed within the said lever openings.

15. In a scale, in combination, a lever having spaced bearings and an opening centered therebetween, and a pair of levers arranged transversely to said first-named lever and having spaced bearings located between the spaced bearings of the first-named lever.

16. In a scale, in combination a lever having spaced bearings and an opening centered therebetween, and a pair of levers arranged transversely to said first-named lever and having spaced bearings located in the opening between the spaced bearings of said first-named lever, all of said bearings lying in the same horizontal plane.

17. In a scale, in combination, a lever having spaced bearings and an opening centered therebetween, and a pair of levers arranged transversely to said first-named lever, the adjoining ends of the transversely disposed levers being located between the bearings of said first-named lever.

18. In a scale, in combination, a lever having spaced bearings and an opening centered therebetween, and a pair of levers arranged transversely to said first-named lever and having spaced bearings in their adjoining ends, the ends of the said transverse levers being disposed between the spaced bearings of said first-named lever.

19. In a scale, in combination, a lever having spaced bearings and an opening centered therebetween, and a pair of levers arranged transversely to said first-named lever and having spaced bearings in their adjoining ends, the ends of the said transverse levers being disposed between the spaced bearings of said first-named lever, all of said bearings lying in the same horizontal plane.

20. In a scale, in combination, a lever having spaced bearings and an opening centered therebetween, and a pair of levers arranged transversely to said first-named lever and having spaced bearings in their adjoining ends, the ends of the said transverse levers being disposed between the spaced bearings of said first-named lever, and a load transmitting member disposed through said opening and having an operative connection with all of the said bearings.

21. In a scale, in combination, a lever having spaced bearings and an opening centered therebetween, a pair of levers arranged transversely to said first-named lever and having spaced bearings in their adjoining ends, the ends of the said transverse levers being disposed between the spaced bearings of said first-named lever, and means for transmitting load stresses from the inner bearings to the said outer bearings.

22. In a scale, in combination, a pair of levers having pivotal bearings arranged in the same horizontal plane, a lever disposed at an angle with respect to said first mentioned levers and having pivotal bearings arranged in the same horizontal plane thereto, and connections between said pair of levers and said lever, said connections being disposed between, and also supported by, said bearings.

23. In a scale, in combination, a pair of levers having pivotal bearings arranged in the same horizontal plane, a transverse lever having pivotal bearings arranged in the same horizontal plane as the said pair of levers, a pair of blocks pivotally engaging said pair of levers, a saddle pivotally supported by the bearings in said transverse lever, and means for suspending the blocks from the saddle.

24. A connection for scale levers including a V-shaped block having pivotally mounted bearings in its extreme ends for supporting the ends of such levers, and a vertical opening centrally disposed between the bearings.

25. In a scale, the combination with a lever having an opening formed therein, of a lever having an end projecting into the said opening, and adjustably mounted universal connections between the said levers.

26. In a scale, the combination with a lever having an opening formed therein, of a lever having an end projecting into the said opening, and flexible aligning connections between the said levers.

27. In a scale, the combination with a lever having an opening formed therein, of a lever having an end projecting into the said opening, and adjustably mounted universal compensating connections between the said levers.

28. In a scale, in combination, a load receiving platform, a pair of main levers under each end of the platform, a transverse extension lever for actuating a weight indicating mechanism, and levers for transmitting load stresses from the main levers to the transverse lever, the levers having pivot bearings lying in the same horizontal plane, and all of said levers comprising a single web that is formed with a double web portion to provide spaced apart seats for the said pivot bearings.

In testimony whereof I hereunto sign my name.

MORTON H. STARR.